US012027795B2

(12) United States Patent
Chen

(10) Patent No.: US 12,027,795 B2
(45) Date of Patent: Jul. 2, 2024

(54) TERMINAL POSITION ASSURANCE AND CONNECTOR

(71) Applicant: Xuancheng Luxshare Precision Industry Co., Ltd, Xuancheng (CN)

(72) Inventor: Xiaoming Chen, Xuancheng (CN)

(73) Assignee: XUANCHENG LUXSHARE PRECISION INDUSTRY CO., LTD, Xuancheng (CN)

( * ) Notice: Subject to any disclaimer, the term of this patent is extended or adjusted under 35 U.S.C. 154(b) by 413 days.

(21) Appl. No.: 17/586,299

(22) Filed: Jan. 27, 2022

(65) Prior Publication Data

US 2023/0163513 A1 May 25, 2023

(30) Foreign Application Priority Data

Nov. 25, 2021 (CN) ........................ 202122917700.5

(51) Int. Cl.
*H01R 13/506* (2006.01)
*H01R 13/58* (2006.01)
*H01R 33/06* (2006.01)

(52) U.S. Cl.
CPC ....... *H01R 13/506* (2013.01); *H01R 13/5825* (2013.01); *H01R 33/06* (2013.01)

(58) Field of Classification Search
CPC .. H01R 13/50; H01R 13/502; H01R 13/5025; H01R 13/506; H01R 13/582; H01R 13/5825; H01R 33/05; H01R 33/06
USPC ........................................................ 439/344
See application file for complete search history.

(56) References Cited

U.S. PATENT DOCUMENTS 11,664,620 B2 * 5/2023 Ripper ................. H01R 13/639 439/352
11,664,622 B2 * 5/2023 Chen .................. H01R 13/6585 439/352
11,664,623 B2 * 5/2023 Yu ...................... H01R 13/6335 439/352
2023/0163513 A1 * 5/2023 Chen ...................... H01R 33/06 439/344

FOREIGN PATENT DOCUMENTS

CN 208461122 U 2/2019

* cited by examiner

*Primary Examiner* — Khiem M Nguyen
(74) *Attorney, Agent, or Firm* — Birch, Stewart, Kolasch & Birch, LLP

(57) ABSTRACT

Provided are a terminal position assurance and a connector, which belong to the technical field of connectors. The terminal position assurance includes a positioning body, an upper-row snap, a limiting member, and a lower-row snap. The positioning body extends along a first direction. Two upper-row snaps are provided, fixedly connected to the positioning body separately, and disposed opposite to each other. The limiting member is connected to one side of the positioning body and extends along a second direction which is perpendicular to the first direction. Two lower-row snaps are provided, fixedly connected to the limiting member separately, and disposed opposite to each other.

18 Claims, 9 Drawing Sheets

TERMINAL POSITION ASSURANCE AND CONNECTOR

CROSS-REFERENCE TO RELATED APPLICATION

This application claims priority to Chinese Patent Application No. 2021229177005 filed Nov. 25, 2021, the disclosure of which is incorporated herein by reference in its entirety.

TECHNICAL FIELD

The present disclosure relates to the technical field of connectors and, in particular, to a terminal position assurance and a connector.

BACKGROUND

A terminal position assurance (TPA) is used for the secondary locking of terminals in a connector, and the terminal position assurance is fixed on a socket of the connector.

In the related art, the terminal position assurance adopts a single-row snap design, that is to say, the terminal position assurance is designed with merely one group of snaps, resulting in the poor stability of the terminal position assurance fixed in the socket. During the transportation and transshipment of the connector, the terminal position assurance is easy to loosen and fall off. As a result, the terminal position assurance is easy to separate from the socket, resulting in that the normal use of the terminal position assurance is affected and potential safety hazards may also be caused in severe cases.

Therefore, there is an urgent need to design the terminal position assurance which can be stably fixed on the socket.

SUMMARY

The present disclosure provides a terminal position assurance and a connector. The terminal position assurance can be stably fixed on a socket, thereby ensuring the normal use of the terminal position assurance and reducing the possibility of potential safety hazards.

As conceived above, the present disclosure provides the technical solutions described below.

A terminal position assurance includes a positioning body, an upper-row snap, a limiting member, and a lower-row snap.

The positioning body extends along a first direction.

Two upper-row snaps are provided, fixedly connected to the positioning body separately, and disposed opposite to each other.

The limiting member is connected to one side of the positioning body and extends along a second direction which is perpendicular to the first direction.

Two lower-row snaps are provided, fixedly connected to the limiting member separately, and disposed opposite to each other. The two lower-row snaps extend along the second direction.

In an embodiment, the upper-row snap extends along the first direction and has a semi-circular cross-section, and a planar side surface of the upper-row snap is fixedly connected to the positioning body.

In an embodiment, the positioning body includes two positioning blocks disposed opposite to each other, and each positioning block extends along the first direction and is fixedly connected to a respective upper-row snap.

In an embodiment, the positioning body further includes a connection block connected between the two positioning blocks.

In an embodiment, the limiting member is connected to the middle of the positioning body, and the upper-row snap is fixedly connected to one end of the positioning body.

In an embodiment, the two lower-row snaps are respectively connected to two ends of the limiting member in a third direction which is perpendicular to the first direction and the second direction separately.

In an embodiment, the lower-row snap includes a connection rod portion and a hook portion connected to one end of the connection rod portion, the hook portion on one connection rod portion extends towards the other connection rod portion, and the other end of the connection rod portion is fixedly connected to the limiting member.

In an embodiment, the terminal position assurance is an integrally formed structure.

A connector includes a socket and any terminal position assurance described above, where the upper-row snap and the lower-row snap of the terminal position assurance snap into the socket separately.

In an embodiment, the socket includes a first block, a second block, and a third block, the second block is connected to one side of the first block in the second direction, fixing snap grooves are respectively disposed on two sides of the second block in the third direction, the two upper-row snaps snap into two fixing snap grooves respectively, the third block is connected to the other side of the first block in the second direction, fixing hook grooves are disposed on parts of two sides of the third block in the third direction, and the two lower-row snaps are hooked in the fixing hook grooves respectively.

In an embodiment, two pre-locking snap grooves are further respectively disposed on the two sides of the second block in the third direction, each pre-locking snap groove is located on the side of a respective fixing snap groove facing away from the first block, and the two upper-row snaps are capable of snapping into the two pre-locking snap grooves respectively.

Two Pre-locking hook grooves are further respectively disposed on the two sides of the third block in the third direction, each of the pre-locking hook grooves is located on the side of a respective fixing hook groove facing towards the first block, the two lower-row snaps are capable of being hooked in the pre-locking hook grooves respectively.

REFERENCE LIST

Figure 1:
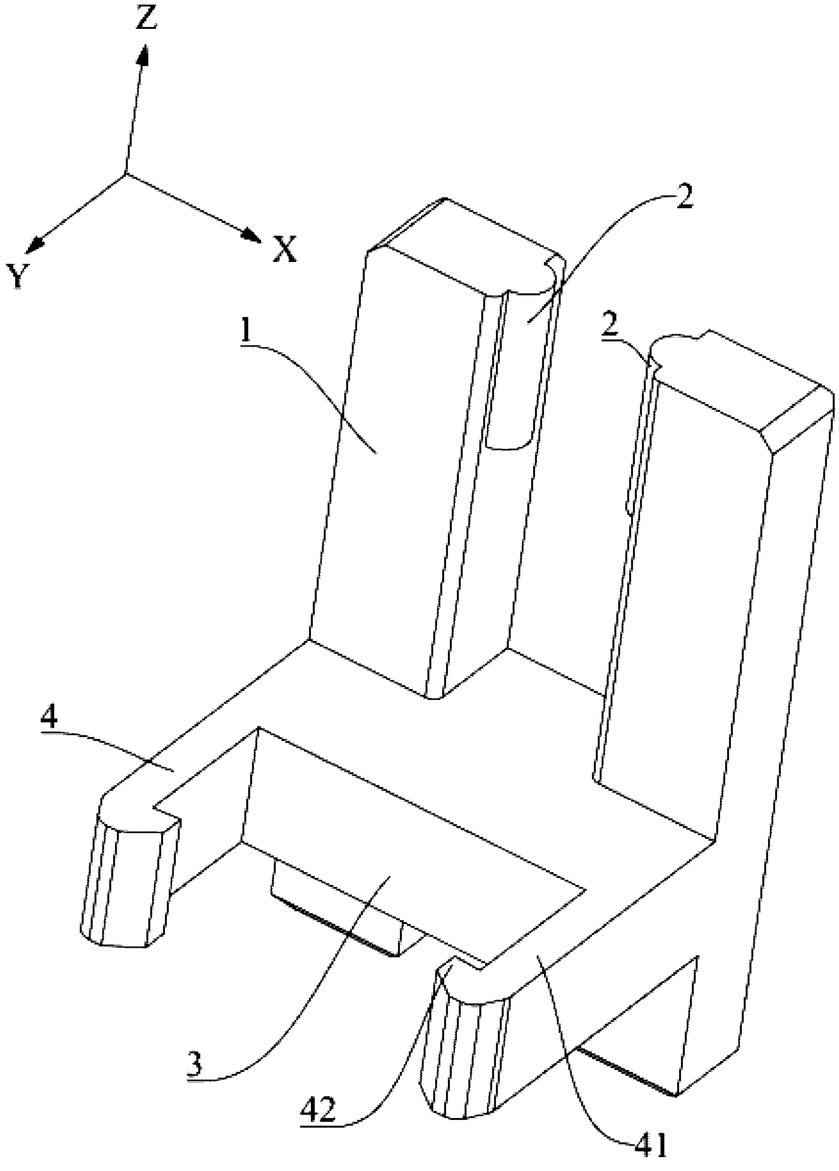
FIG. 1 is structure view one of a terminal position assurance according to embodiment one of the present disclosure.

1 positioning body
11 positioning block
12 connection block
2 upper-row snap
3 limiting member
4 lower-row snap
41 connection rod portion
42 hook portion
10 socket
101 first block
102 second block
1021 fixing snap groove
1022 pre-locking snap groove
103 third block
1031 fixing hook groove
1032 pre-locking hook groove
104 inserting groove
20 terminal position assurance

DETAILED DESCRIPTION

To make the solved technical problems, adopted technical solutions, and achieved technical effects of the present disclosure more apparent, the technical solutions of the present disclosure are further described hereinafter in conjunction with drawings and embodiments. It is to be understood that the embodiments described herein are intended to merely illustrate and not to limit the present disclosure. Additionally, it is to be noted that for ease of description, merely a part, not all, related to the present disclosure is illustrated in the drawings.

In the description of the present disclosure, unless otherwise expressly specified and limited, terms "connected to each other", "connected", and "fixed" are to be understood in a broad sense. For example, the term "connected" may refer to "fixedly connected", "detachably connected", or "integrated", may refer to "mechanically connected" or "electrically connected", may refer to "directly connected to each other" or "indirectly connected to each other via an intermediary", or may refer to "internally connected between two components" or "an interactive relationship between two components". For those of ordinary skill in the art, specific meanings of the preceding terms in the present disclosure may be understood based on specific situations.

In the present disclosure, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above", or "over" the second feature, the first feature is right on, above, or over the second feature, the first feature is obliquely on, above, or over the second feature, or the first feature is simply at a higher level than the second feature. When the first feature is described as "under", "below" or "underneath" the second feature, the first feature is right under, below or underneath the second feature, the first feature is obliquely under, below or underneath the second feature, or the first feature is simply at a lower level than the second feature.

In the description of the embodiment, orientations or position relations indicated by terms such as "upper", "lower", "right", and the like are based on orientations or position relations shown in the drawings. These orientations or position relations are intended merely to facilitate and simplify the description of the present disclosure, and not to indicate or imply that a device or element referred to must have such specific orientations or must be configured or operated in such specific orientations. Therefore, these orientations or position relations are not to be construed as limiting the present disclosure. In addition, the terms "first" and "second" are used merely to distinguish between descriptions and have no special meaning.

Embodiment One

This embodiment provides a terminal position assurance which can be stably fixed on a socket and does not easily loosen or fall off, thereby ensuring the normal use of the terminal position assurance.

As shown in FIG. 1, a terminal position assurance 20 includes a positioning body 1, an upper-row snap 2, a limiting member 3, and a lower-row snap 4.

The positioning body 1 extends along a first direction Z. Two upper-row snaps 2 are provided, fixedly connected to the positioning body 1 separately, and disposed opposite to each other. Each upper-row snap 2 can snap into a fixing snap groove 1021 of a socket 10 and the two upper-row snaps 2 can snap onto the socket 10 at the same time so that the terminal position assurance 20 can be positioned on the socket 10.

With continued reference to FIG. 1, the limiting member 3 is vertically connected to one side of the positioning body 1 and extends along a second direction Y. The limiting member 3 is configured to be inserted into an inserting groove 104 of the socket 10 so that the limiting member 3 is positioned in the first direction Z through the inserting groove 104. Thus, the positioning body 1 is positioned in the first direction Z. In this embodiment, the second direction Y is perpendicular to the first direction Z.

Two lower-row snaps 4 are provided, fixedly connected to the limiting member 3 separately, and disposed opposite to each other. The two lower-row snaps 4 extend along the second direction Y. Each lower-row snap 4 is configured to snap into a fixing hook groove 1031 of the socket 10 so as to assist the upper-row snap 2 in making the terminal position assurance 20 snap onto the socket 10. It is to be noted that the upper-row snaps 2 and the lower-row snaps 4 each limit the terminal position assurance 20 in the second direction Y, and the upper-row snaps 2 and the lower-row snaps 4 can also limit the terminal position assurance 20 in the third direction X, where the third direction X is perpendicular to the first direction Z and the second direction Y separately.

In the terminal position assurance 20 provided in this embodiment, the limiting member 3 is provided so that the terminal position assurance 20 can be limited on the socket 10 in the first direction Z. In addition, the upper-row snap 2 and the lower-row snap 4 are provided so that the terminal position assurance 20 can be limited on the socket 10 in the second direction Y and the third direction X. Thus, the terminal position assurance 20 is limited in multiple directions and the multiple limitations can reduce the probability of loosening and falling of the terminal position assurance 20 so that the terminal position assurance 20 can be stably fixed on the socket 10, thereby ensuring the normal use of the terminal position assurance 20 and reducing the possibility of potential safety hazards.

Optionally, as shown in FIG. 1, the upper-row snap 2 extends along the first direction Z and has a semi-circular cross-section, that is, the upper-row snap 2 has a semi-cylindrical shape. Correspondingly, the fixing snap groove 1021 of the socket 10 may have the shape of a circular arc so as to facilitate mating with the upper-row snap 2. The upper-row snap 2 has a planar side surface which is fixedly connected to the positioning body 1. The upper-row snap 2 has a curved side surface which is used for snapping into the fixing snap groove 1021. In this embodiment, the surface of the positioning body 1 for disposing the upper-row snap 2 is planar.

Figure 2:
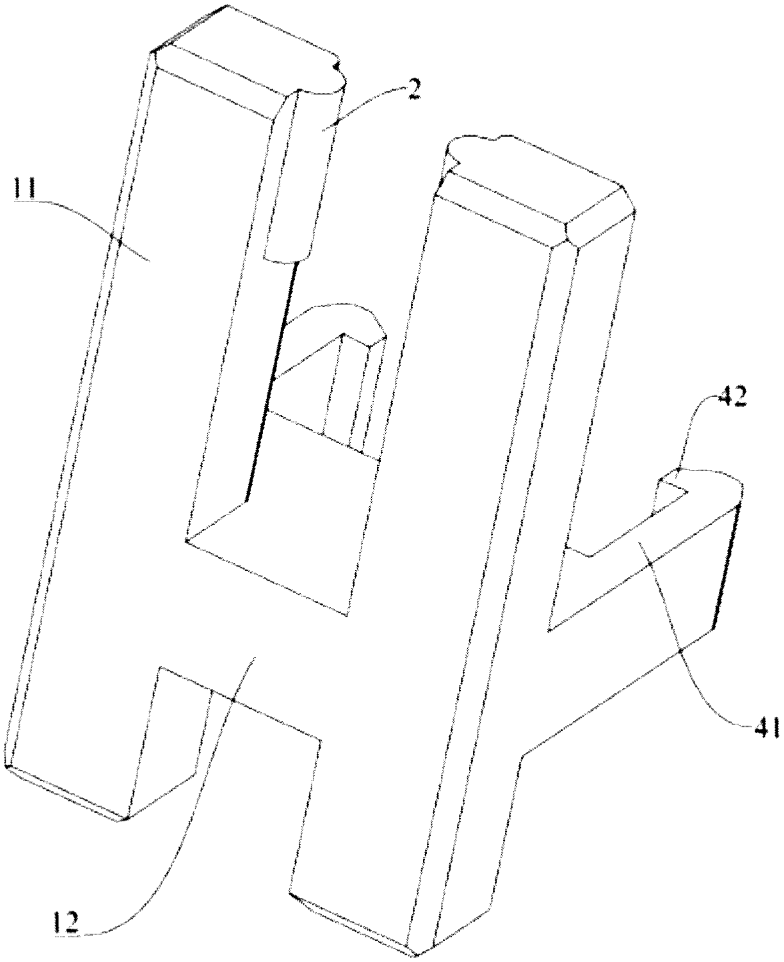
FIG. 2 is structure view two of the terminal position assurance according to embodiment one of the present disclosure.

Further, as shown in FIG. 2, the positioning body 1 includes two positioning blocks 11 disposed opposite to each other. Each positioning block 11 extends along the first direction Z. One upper-row snap 2 is fixedly connected to each positioning block 11. Specifically, the upper-row snap 2 on one positioning block 11 is located on the side surface of the one positioning block 11 facing towards the other positioning block 11. For example, the positioning body 1 has a cuboid shape. Edges of the positioning body 1 are chamfered to avoid scratching the socket 10 or a structure on the socket 10. As shown in FIG. 1, the length of the upper-row snap 2 is less than half the length of a positioning block 11.

Further, the positioning body 1 also includes a connection block 12 connected between the two positioning blocks 11. The connection block is used for connecting the two positioning blocks 11 so as to define the distance between the two positioning blocks 11. In some embodiments, the connection block can snap into the inserting groove 104.

Optionally, with continued reference to FIG. 1, the upper-row snap 2 is fixedly connected to one end of the positioning block 11. In addition, the top surface of the upper-row snap 2 is coplanar with the top surface of the positioning block 11. The limiting member 3 is connected to the middle of the positioning block 11. In some embodiments, the limiting member 3 is close to the other end of the positioning block 11. In this embodiment, the limiting member 3 is connected to the connection block 12 and the positioning block 11. The thickness of the limiting member 3 is equal to the thickness of the connection block 12. In some embodiments, specifically, the limiting member 3 is a block-like structure. The dimension of the limiting member 3 in the third direction X is equal to the length of the positioning body 1 in the third direction X. The upper-row snap 2 is disposed at one end of the positioning block 11 and the lower-row snap 4 is disposed close to the other end of the positioning block 11 so that two ends of the positioning block 11 in the extending direction of the positioning block 11 can be limited, thereby further improving the fixing effects of the positioning body 1 and the terminal position assurance 20.

As shown in FIG. 1, the two lower-row snaps 4 are respectively connected to two ends of the limiting member 3 in the third direction X, that is, the two lower-row snaps 4 are spaced apart in the third direction X. Thus, the two lower-row snaps 4 can hold the third block 103 of the socket 10.

Optionally, as shown in FIG. 1 or FIG. 2, each lower-row snap 4 includes a connection rod portion 41 and a hook portion 42 connected to one end of the connection rod portion 41. The hook portion 42 on one connection rod portion 41 extends towards the other connection rod portion 41, that is, both two hook portions 42 are disposed towards the center of the limiting member 3. The other end of the connection rod portion 41 is fixedly connected to the limiting member 3.

In some embodiments, the terminal position assurance 20 is an integrally formed structure, that is, the positioning body 1, the upper-row snap 2, the limiting member 3, and the lower-row snap 4 can be formed in a single manufacturing process to have high strength and not easily break. In other embodiments, the terminal position assurance 20 may also be a split structure, which is not limited in this embodiment.

Embodiment Two

This embodiment provides a connector. As shown in FIGS. 3 to 9, the connector includes the terminal position assurance 20 in embodiment one and a socket 10. The upper-row snap 2 and the lower-row snap 4 of the terminal position assurance 20 snap into the socket 10 separately. The limiting member 3 is limited in the inserting groove 104 of the socket 10. It is to be understood that the connector further includes other structures such as a connector body. For details, reference may be made to the related art. The other structures will not be described in this embodiment.

In the connector provided by this embodiment, the terminal position assurance 20 can be firmly fixed on the socket 10 so that the terminal position assurance 20 does not easily loosen or fall off during the transportation of the connector, thereby improving the reliability of the connector.

Figure 3:
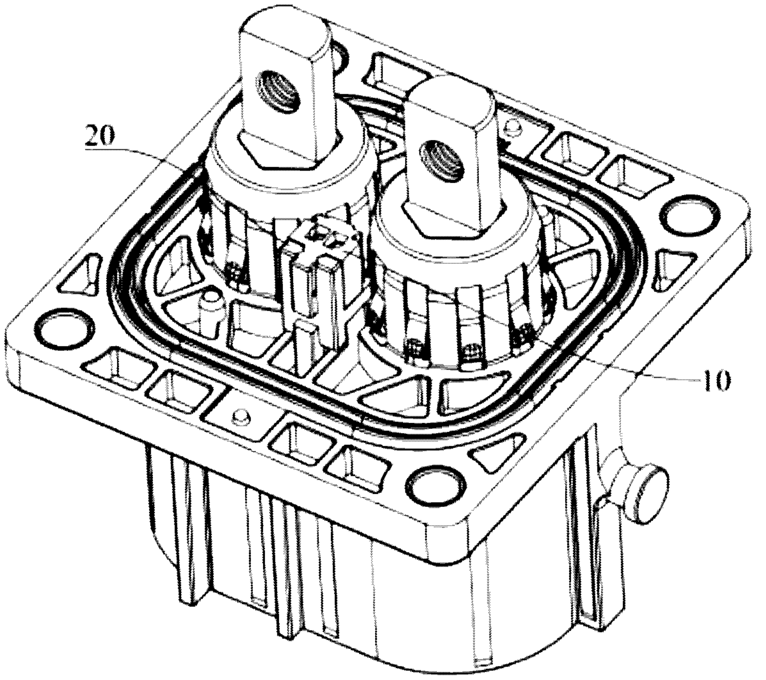
FIG. 3 is a structure view of a connector according to embodiment two of the present disclosure.
Figure 4:
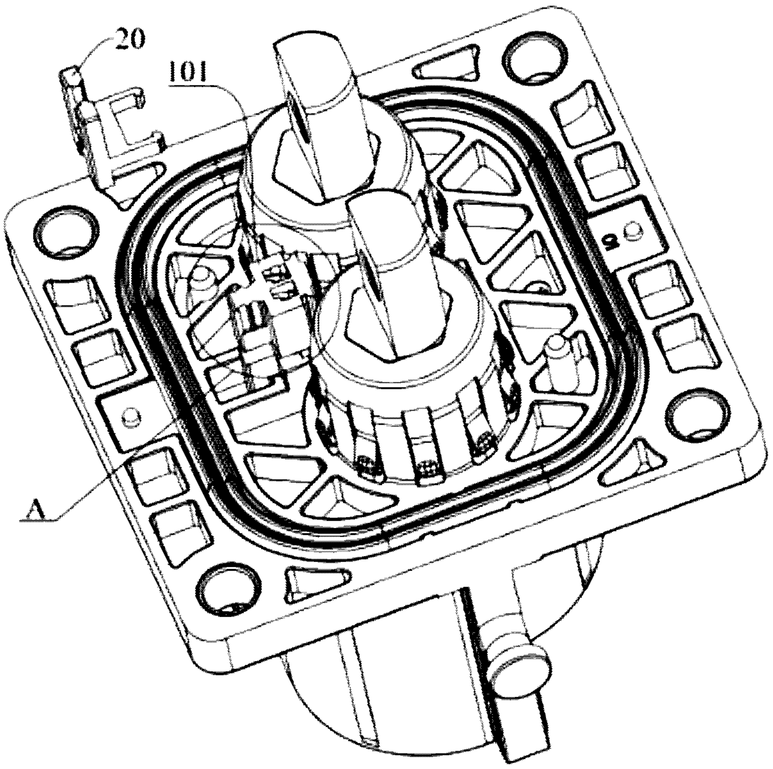
FIG. 4 is an exploded view of the connector according to embodiment two of the present disclosure.
Figure 5:
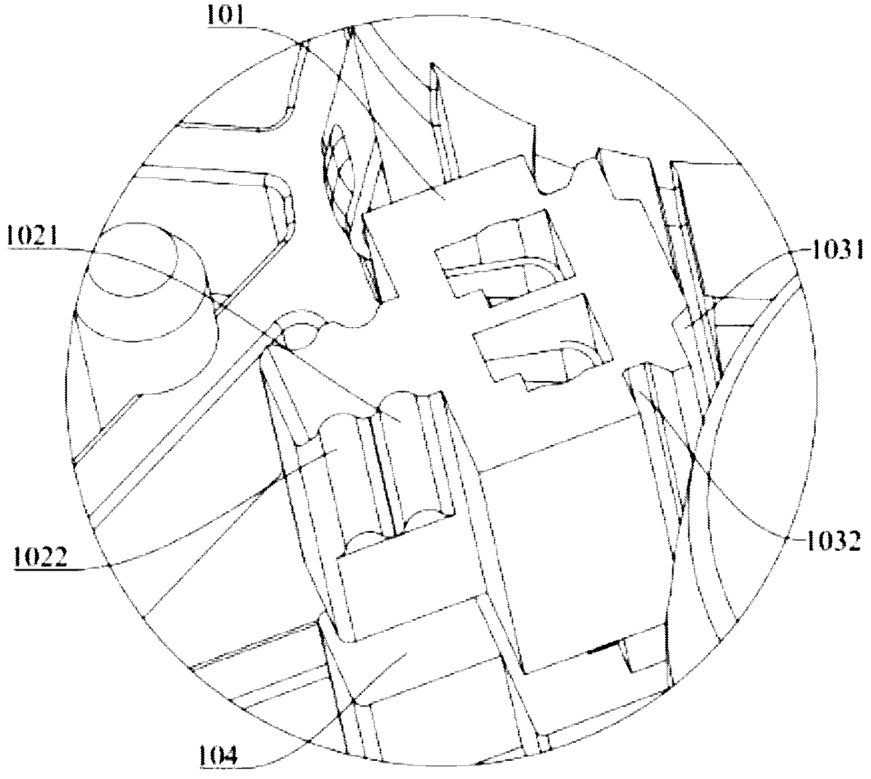
FIG. 5 is an enlarged view of portion A in FIG. 4 according to embodiment two of the present disclosure.

Optionally, as shown in FIGS. 3 to 5, the socket 10 includes a first block 101, a second block 102, and a third block 103. The second block 102 is connected to one side of the first block 101 in the second direction Y. Two fixing snap grooves 1021 are respectively disposed on two sides of the second block 102 in the third direction X. The two upper-row snaps 2 can snap into the two fixing snap grooves 1021 respectively so as to position one end of the terminal position assurance 20 on the socket 10.

As shown in FIG. 5, the third block 103 is connected to the other side of the first block 101 in the second direction Y. Two fixing hook grooves 1031 are disposed on two sides of the third block 103 in the third direction X. The two lower-row snaps 4 can be hooked in the two fixing hook grooves 1031 respectively so as to position the other end of the terminal position assurance 20 on the socket 10.

Further, with continued reference to FIG. 5, two pre-locking snap grooves 1022 are further respectively disposed on the two sides of the second block 102 in the third direction X. Each pre-locking snap groove 1022 is located on the side of a respective fixing snap groove 1021 facing away from the first block 101. The two upper-row snaps 2 can also snap into the two fixing snap grooves 1021 respectively so as to implement the pre-locking of the terminal position assurance 20.

Similarly, two pre-locking hook grooves 1032 are further respectively disposed on the two sides of the third block 103 in the third direction X. Each pre-locking hook groove 1032 is located on the side of a respective fixing hook groove 1031 facing towards the first block 101. The two lower-row snaps 4 can also be hooked in the two pre-locking hook grooves 1032 respectively so as to implement the pre-locking of the terminal position assurance 20.

Figure 6:
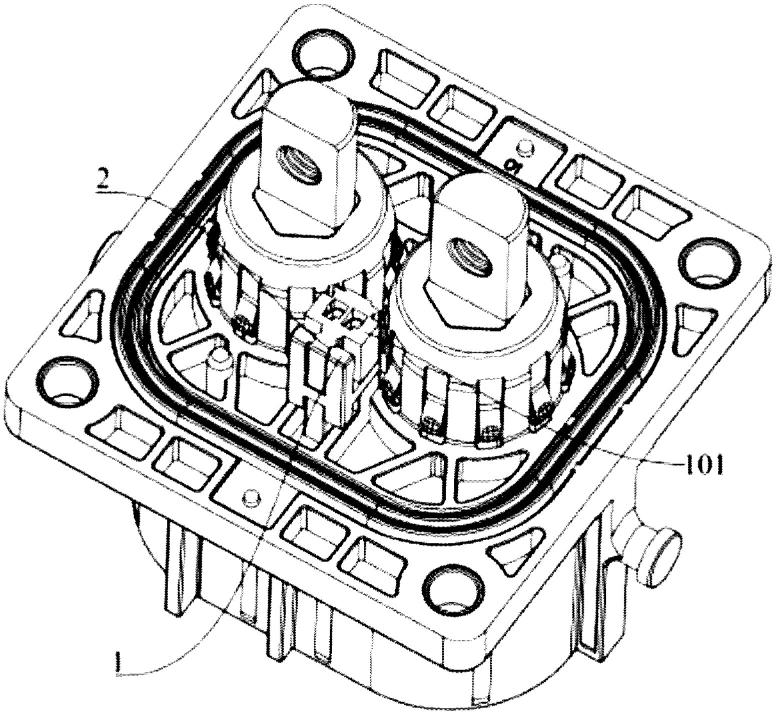
FIG. 6 is a schematic view of a terminal position assurance in a pre-locked state according to embodiment two of the present disclosure.
Figure 7:
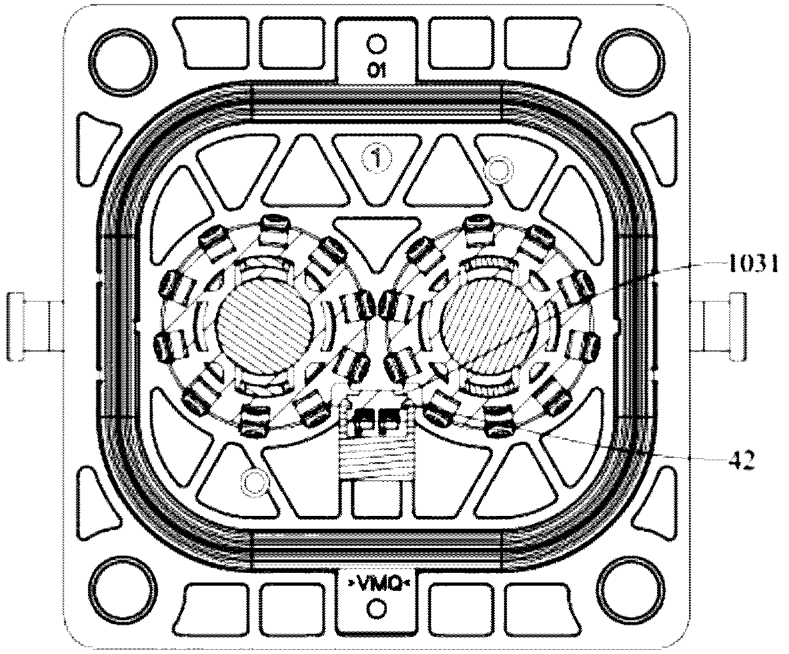
FIG. 7 is a sectional view of the terminal position assurance in the pre-locked state according to embodiment two of the present disclosure.
Figure 8:
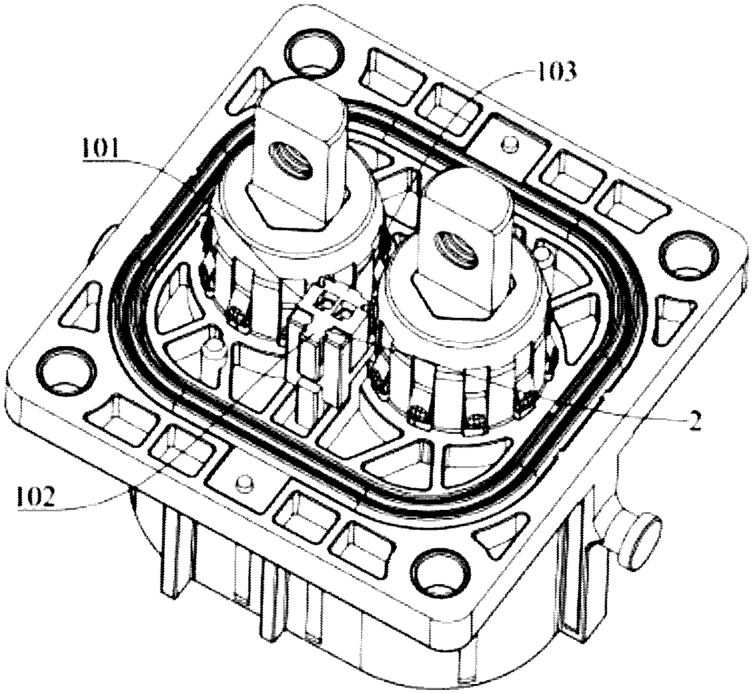
FIG. 8 is a schematic view of the terminal position assurance in a locked state according to embodiment two of the present disclosure.
Figure 9:
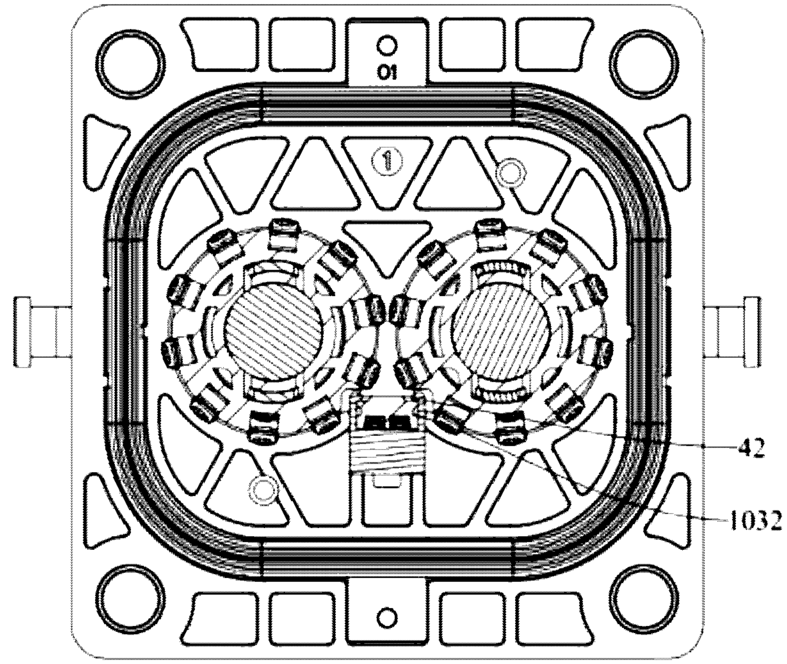
FIG. 9 is a sectional view of the terminal position assurance in the locked state according to embodiment two of the present disclosure.

FIGS. 6 and 7 show schematic views of the terminal position assurance 20 in a pre-locked state. In this case, the two upper-row snaps 2 snap into the two pre-locking snap grooves 1022 respectively, the two lower-row snaps 4 snap into the two pre-locking hook grooves 1032 respectively, and the limiting member 3 is located in the inserting groove 104. When the terminal position assurance 20 is moved from the pre-locked state to a locked state, the terminal position assurance 20 is pushed along a preset direction so that the upper-row snaps 2 slide out of the pre-locking snap grooves 1022 and then enter the fixing snap grooves 1021. At the same time, the lower-row snaps 4 slide out of the pre-locking hook grooves 1032 and then enter the fixing hook grooves 1031. In this case, the terminal position assurance 20 and the socket 10 are in the state as shown in FIGS. 8 and 9. The preset direction is the direction in which the second block 102 points to the third block 103.

The preceding embodiments illustrate only the basic principles and features of the present disclosure. The present disclosure is not limited to the preceding embodiments. Various modifications and variations may be made in the present disclosure without departing from the spirit and scope of the present disclosure. These modifications and variations fall within the scope of the present disclosure. The scope of the present disclosure is defined by the appended claims and equivalents thereof.

What is claimed is:

1. A terminal position assurance, comprising:
- a positioning body extending along a first direction;
- two upper-row snaps fixedly connected to the positioning body separately and disposed opposite to each other;
- a limiting member connected to one side of the positioning body and extending along a second direction which is perpendicular to the first direction; and
- two lower-row snaps fixedly connected to the limiting member separately, disposed opposite to each other, and extending along the second direction.

2. The terminal position assurance according to claim 1, wherein each of the two upper-row snaps extends along the first direction and has a semi-circular cross-section, and a planar side surface of the each of the two upper-row snaps is fixedly connected to the positioning body.

3. The terminal position assurance according to claim 2, wherein the positioning body comprises two positioning blocks disposed opposite to each other, and each of the two positioning blocks extends along the first direction and is fixedly connected to a respective one of the two upper-row snaps.

4. The terminal position assurance according to claim 3, wherein the positioning body further comprises a connection block connected between the two positioning blocks.

5. The terminal position assurance according to claim 1, wherein the limiting member is connected to a middle of the positioning body, and the two upper-row snaps are fixedly connected to one end of the positioning body.

6. The terminal position assurance according to claim 1, wherein the two lower-row snaps are respectively connected to two ends of the limiting member in a third direction which is perpendicular to the first direction and the second direction separately.

7. The terminal position assurance according to claim 1, wherein each of the two lower-row snaps comprises a connection rod portion and a hook portion connected to one end of the connection rod portion, a hook portion on one connection rod portion extends towards another connection rod portion, and another end of the connection rod portion is fixedly connected to the limiting member.

8. The terminal position assurance according to claim 1, wherein the terminal position assurance is an integrally formed structure.

9. A connector, comprising a socket and a terminal position assurance, wherein the terminal position assurance comprises:
- a positioning body extending along a first direction;
- two upper-row snaps fixedly connected to the positioning body separately and disposed opposite to each other;
- a limiting member connected to one side of the positioning body and extending along a second direction which is perpendicular to the first direction; and
- two lower-row snaps fixedly connected to the limiting member separately, disposed opposite to each other, and extending along the second direction, wherein the two upper-row snaps and the two lower-row snaps of the terminal position assurance snap into the socket separately.

10. The connector according to claim 9, wherein the socket comprises a first block, a second block, and a third block, the second block is connected to one side of the first block in the second direction, two fixing snap grooves are respectively disposed on two sides of the second block in the third direction, the two upper-row snaps snap into the two fixing snap grooves respectively, the third block is connected to the other side of the first block in the second direction, two fixing hook grooves are disposed on two sides of the third block in the third direction, and the two lower-row snaps are hooked in the two fixing hook grooves respectively.

11. The connector according to claim 10, wherein two pre-locking snap grooves are further respectively disposed on the two sides of the second block in the third direction, each of the two pre-locking snap grooves is located on a side of a respective one of the two fixing snap grooves facing away from the first block, and the two upper-row snaps are capable of snapping into the two pre-locking snap grooves respectively; and
- two pre-locking hook grooves are further respectively disposed on the two sides of the third block in the third direction, each of the two pre-locking hook grooves is located on a side of a respective one of the fixing hook grooves facing towards the first block, the two lower-row snaps are capable of being hooked in the pre-locking hook grooves respectively.

12. The terminal position assurance according to claim 9, wherein each of the two upper-row snaps extends along the first direction and has a semi-circular cross-section, and a planar side surface of the each of the two upper-row snaps is fixedly connected to the positioning body.

13. The terminal position assurance according to claim 10, wherein the positioning body comprises two positioning blocks disposed opposite to each other, and each of the two positioning blocks extends along the first direction and is fixedly connected to a respective one of the two upper-row snaps.

14. The terminal position assurance according to claim 11, wherein the positioning body further comprises a connection block connected between the two positioning blocks.

15. The terminal position assurance according to claim 9, wherein the limiting member is connected to a middle of the positioning body, and the two upper-row snaps are fixedly connected to one end of the positioning body.

16. The terminal position assurance according to claim 9, wherein the two lower-row snaps are respectively connected to two ends of the limiting member in a third direction which is perpendicular to the first direction and the second direction separately.

17. The terminal position assurance according to claim 9, wherein each of the two lower-row snaps comprises a connection rod portion and a hook portion connected to one end of the connection rod portion, a hook portion on one connection rod portion extends towards another connection rod portion, and another end of the connection rod portion is fixedly connected to the limiting member.

18. The terminal position assurance according to claim 9, wherein the terminal position assurance is an integrally formed structure.

* * * * *